United States Patent
Zhao et al.

(10) Patent No.: US 12,472,250 B2
(45) Date of Patent: Nov. 18, 2025

(54) PREPARATION OF ZINC ZOLEDRONATE MICRO-NANOPARTICLE ADJUVANT AND USE THEREOF AS VACCINE ADJUVANT

(71) Applicants: XIAMEN INNOVAX BIOTECH CO., LTD., Fujian (CN); XIAMEN UNIVERSITY, Fujian (CN)

(72) Inventors: Qinjian Zhao, Fujian (CN); Xiaofen Huang, Fujian (CN); Siyi Chen, Fujian (CN); Yike Li, Fujian (CN); Cai Zhang, Fujian (CN); Ningshao Xia, Fujian (CN)

(73) Assignees: Xiamen Innovax Biotech Co., Ltd., Fujian (CN); Xiamen University, Fujian (CN)

( * ) Notice: Subject to any disclaimer, the term of this patent is extended or adjusted under 35 U.S.C. 154(b) by 1053 days.

(21) Appl. No.: 17/602,214

(22) PCT Filed: Apr. 10, 2020

(86) PCT No.: PCT/CN2020/084190
§ 371 (c)(1),
(2) Date: Oct. 7, 2021

(87) PCT Pub. No.: WO2020/207472
PCT Pub. Date: Oct. 15, 2020

(65) Prior Publication Data
US 2022/0193231 A1 Jun. 23, 2022

(30) Foreign Application Priority Data
Apr. 11, 2019 (CN) .......................... 201910287805.1

(51) Int. Cl.
| | | |
|---|---|---|
| A61K 39/39 | (2006.01) | |
| A61K 9/14 | (2006.01) | |
| A61K 39/25 | (2006.01) | |
| A61K 39/29 | (2006.01) | |
| A61P 31/22 | (2006.01) | |
| A61P 37/04 | (2006.01) | |
| A61K 39/00 | (2006.01) | |

(52) U.S. Cl.
CPC ................ *A61K 39/39* (2013.01); *A61K 9/14* (2013.01); *A61K 39/25* (2013.01); *A61K 39/292* (2013.01); *A61P 31/22* (2018.01); *A61P 37/04* (2018.01); *A61K 2039/55511* (2013.01)

(58) Field of Classification Search
None
See application file for complete search history.

(56) References Cited

U.S. PATENT DOCUMENTS

| | | | | |
|---|---|---|---|---|
| 5,252,327 A | * | 10/1993 | Bernhardt | ............... A61P 37/04 424/229.1 |
| 8,722,030 B2 | | 5/2014 | Hu et al. | |
| 9,573,811 B2 | | 2/2017 | Thiriot | |
| 10,471,141 B2 | * | 11/2019 | Shishido | ................ A61K 39/00 |
| 10,925,936 B2 | | 2/2021 | Shishido et al. | |
| 2008/0286352 A1 | * | 11/2008 | Kumar | ................... A61K 31/41 514/109 |
| 2017/0281759 A1 | | 10/2017 | Shishido et al. | |
| 2020/0254089 A1 | | 8/2020 | Asari et al. | |

FOREIGN PATENT DOCUMENTS

| | | |
|---|---|---|
| CN | 101252912 A | 8/2008 |
| CN | 101444623 A | 6/2009 |
| CN | 101972477 A | 2/2011 |
| CN | 102085366 A | 6/2011 |
| CN | 102939105 A | 2/2013 |
| CN | 103768595 A | 5/2014 |
| CN | 104096229 A | 10/2014 |
| CN | 106687127 A | 5/2017 |
| CN | 106687138 A | 5/2017 |
| DE | 4244422 A1 | 6/1994 |
| WO | 2008/040763 A1 | 4/2008 |
| WO | 2008/064849 A1 | 6/2008 |
| WO | 2011/075822 A1 | 6/2011 |
| WO | 2016156398 A1 | 10/2016 |
| WO | 2018/225784 A1 | 12/2018 |

OTHER PUBLICATIONS

Kharuja et al. (European Journal of Pharmaceutica Sciences, 2015, p. 173-183).*
Afshari et al., "Oral treatment with zinc sulfate increases the expression of Th1 cytokines mRNA in BALB/c mice infected with Leishmania major," Cytokine 81:71-76 (2016).
Ai et al., "Analysis of physicochemical properties of three aluminum hydroxide adjuvant," Chinese Journal of Biologicals 28(1):44-47 (2015), English Abstract attached.
Bonaventura et al., "Zinc and its role in immunity and inflammation," Autoimmunity Reviews 14(4):277-285 (2015).
Cai et al., "Effect of zinc hydroxide and heparan sulfate compound adjuvant on humoral immunity induced by rabies vaccine in mice," Chinese Journal of Biologicals 26(5):608-610 (2013), English Abstract attached.
Goldenthal et al., "Safety evaluation of vaccine adjuvants: National Cooperative Vaccine Development Working Group," AIDS Res Hum Retroviruses 9(1):S47 (1993).
NPL6 Haase et al., "The immune system and the impact of zinc during aging," Immunity & Ageing 6(1):1-7 (2009).

(Continued)

*Primary Examiner* — Agnieszka Boesen
(74) *Attorney, Agent, or Firm* — Medler Ferro Woodhouse & Mills PLLC (57) ABSTRACT

Disclosed is a zinc zoledronate micro-nanoparticle adjuvant, which contains zinc and zoledronic acid and optionally contains a phosphate and aluminum. The preparation method therefor comprises performing mixed precipitation on a soluble salt solution containing zinc ions, zoledronic acid, and sodium hydroxide. The adjuvant can be used to prepare vaccines, etc.

9 Claims, 4 Drawing Sheets

(56) References Cited

OTHER PUBLICATIONS

Park et al., "Zoledronic acid induces dose-dependent increase of antigen-specific CD8 T-cell responses in combination with peptide/poly-IC vaccine," Vaccine 34(10):1275-1281 (2016).
Tonti et al., "Bisphosphonates target B cells to enhance humoral immune responses," Cell Rep. 5(2):323-330 (2013).
Wang et al., "Immunopotentiation of Recombinant Hepatitis C Virus Antigen Multi-epitope Peptide Vaccine by Heparan Sulfate and Zina Hydroxide Compound as an Adjuvant," Chinese Journal of Biologicals 24(10):1174-1176 (2011), English Abstract attached.
English translation of the International Search Report in PCT/CN2020/084190, mailed Jul. 14, 2020.
Gouin et al., "Adjuvant treatment with zoledronic acid after extensive curettage for giant cell tumours of bone," European Journal of Cancer 50(14):2425-2431 (2014).
Chaudhari et al., "Targeting Efficiency and Biodistribution of Zoledronate Conjugated Docetaxel Loaded Pegylated PBCA Nanoparticles for Bone Metastasis," *Advanced Functional Materials* 22(19):4101-4114 (2012).

\* cited by examiner

Aluminum adjuvant: Solution A: aluminum chloride solution; Solution B: a mixture solution of sodium hydroxide and disodium hydrogen phosphate
Zinc zoledronate adjuvant: Solution A: zinc chloride solution; Solution B: a combined solution of B1 and B2;
Solution B1: sodium zoledronate solution; Solution B2: sodium hydroxide solution or a mixture solution of sodium hydroxide and disodium hydrogen phosphate

Fig. 1

Zn-zoledronic acid (1/0.25)     FH-001-zoledronic acid     Al-001-zoledronic acid

PREPARATION OF ZINC ZOLEDRONATE MICRO-NANOPARTICLE ADJUVANT AND USE THEREOF AS VACCINE ADJUVANT

TECHNICAL FIELD

The present invention relates to a vaccine adjuvant, in particular to a zinc zoledronate micro/nanoparticle adjuvant with sustained-release effect, which can significantly enhance humoral immune response and cellular immune response, and can be used as a vaccine adjuvant in vaccine preparation. The present invention pertains to the field of immunology.

BACKGROUND ART

Zinc is an important chemical element with special biological functions. For example, trace levels of zinc are present in about 300 enzymes involved in cellular metabolism, and they play an important role in cell respiration, cell division, protein synthesis, DNA synthesis, damage repair, and immune function activation. Therefore, Zinc deficiency or disorder is related to many diseases, especially diseases of the immune system (Autoimmunity Reviews, 2015, 14 (04) 277-285). In immunocytes, divalent cations, including zinc, play an important role in the regulation of intracellular signaling pathways. Zinc deficiency affects the survival, proliferation, and maturation of lymphocytes in innate immunity and adaptive immunity; studies have reported that zinc deficiency has adverse effects on the production and function of cytokines of immunocytes, and on the number, proliferation and differentiation of peripheral and thymic T cells. Studies have found that the lack of trace zinc will lead to immune aging in the elderly (Immunity & Ageing, 2009, 6(9): 1-17). In short, zinc plays an important role in the production, development and function of T cells.

Bisphosphonates (BPs), as the most important drugs for treating osteoporosis, are inorganic pyrophosphate analogues. They are formed by replacing oxygen atom in pyrophosphate P-O-P bond with carbon atom and have a special P-C-P bond skeleton. They cannot be easily enzymatically hydrolyzed in body, resistant to high temperature, and stable to many chemical substances. Meanwhile, due to the P-C-P molecular configuration, its three-dimensional structure can be combined with hydroxyapatite or calcium, iron and zinc metal ions. Zoledronic acid (ZOL) is a nitrogen-containing bisphosphonic acid drug with a heterocyclic structure. It has characteristics of strong effect, low dose and convenience for use. Clinical studies have shown that bisphosphonates being used as an adjuvant treatment of diseases such as multiple myeloma, breast cancer, kidney cancer, prostate cancer and etc. can reduce the incidence of bone-related diseases in patients, reduce the recurrence rate of cancer, and prolong the survival time of patients, thereby improving clinical results. Zoledronate is especially advantageous in terms of anti-tumor effect, and it has been widely used in clinical studies of a variety of malignant tumors. In addition, other studies have found that bisphosphonate drugs also have immunomodulatory effects, and can improve the humoral immune response by acting on B cells (Cell Rep., 2013, 5(2)); and zoledronic acid can increase antigen-specific CD8+ T cell response (Vaccine, 2016, 34(10): 1275-81).

Dieter Berndardt et al. invented a zinc hydroxide gel or iron hydroxide gel, its preparation process and its application as a vaccine adjuvant (U.S. Pat. No. 5,252,327, grant date: Oct. 12, 1993). Zinc hydroxide gel or iron hydroxide gel has a good adsorption effect on viruses or proteins and has a good adjuvant effect; zinc hydroxide gel can stimulate body's both humoral and cellular immune response, while iron hydroxide gel mainly enhances humoral immune response, and both of them have good local and systemic tolerance; and both of them has a better immune stimulation effect when used in combination with lecithin.

Hu Yunzhang et al. invented a vaccine adjuvant (Chinese Patent, publication (announcement) No. CN101444623A, publication (announcement) date: Jun. 3, 2009). The invention relates to a vaccine adjuvant, that is, a zinc hydroxide compound, having a chemical formula of $Zn(OH)_2$ and a chemical formula weight of 99.4046 Daltons, for use in the manufacture of an adjuvant for vaccines, and for use in the manufacture of an adjuvant for hepatitis A vaccine. The zinc hydroxide being used in combination with vaccine as an adjuvant, can effectively enhance the humoral immune response of the vaccine, and its immune enhancement effect is better than that of aluminum adjuvant. And the results of animal testing shows that zinc hydroxide as a new vaccine adjuvant has better sensitization effect and better safety property than aluminum adjuvant.

Wang Haixuan et al. (Chinese Journal of Biologicals, 2011, 24(10): 1174-1176) studied the immunopotentiation of heparan sulfate (HS) and zinc hydroxide as an adjuvant on the humoral immune response in mice induced by recombinant Hepatitis C virus antigenic epitope polypeptide vaccine, and the results indicated that the composite adjuvant of HS and zinc hydroxide can effectively enhance the humoral immune response in mice immunized with recombinant HCV antigenic epitope polypeptide vaccine, and can to some extent save the dosage of antigen.

Hu Yunzhang et al. invented a zinc phosphate vaccine adjuvant (Chinese Patent, publication (announcement) No. CN101972477B, publication (announcement) date: Sep. 26, 2012). The invention relates to a zinc phosphate vaccine adjuvant, especially relates to the use of zinc phosphate as a vaccine adjuvant and the use of zinc phosphate vaccine adjuvant in the manufacture of vaccines. The zinc phosphate is used as a vaccine adjuvant in combination with an antigen, which can effectively enhance the humoral immune response of the vaccine. Its immune enhancement effect is better than that of aluminum adjuvant and zinc hydroxide adjuvant, and the result of animal testing showed that when used as a vaccine adjuvant, zinc phosphate showed better sensitization effect and better safety property than aluminum adjuvant and zinc hydroxide adjuvant.

Hu Yunzhang et al. invented a composite vaccine adjuvant (Chinese Patent, publication (announcement) No. CN102085366B, published (announcement) date: Dec. 26, 2012). The invention provides a composite vaccine adjuvant, which characterized in that it consists of the following components: sodium ferulate and zinc hydroxide in a mass ratio of 10:1 to 50:1. The combination use of the composite vaccine adjuvant and a vaccine can effectively enhance the humoral immune response of the vaccine. The enhancement effect is similar to that of aluminum adjuvant, while is superior to that of sodium ferulate adjuvant alone and zinc hydroxide adjuvant alone. And it is non-toxic and free of side effects, and is safe and reliable within the dosage required for immunization. The raw materials of the composite vaccine adjuvant of the invention are easily available and are commercially available products. The composite vaccine adjuvant has simple preparation process, low cost and stable performance. The composite vaccine adjuvant can be used as an adjuvant for hepatitis B vaccine, genetic engineering vaccine, virus vaccine and the like.

Wang Haixuan et al invented a zoledronic acid adjuvant and a vaccine containing zoledronic acid adjuvant (Chinese Patent, publication (announcement) No. CN103768595 B, publication (announcement) date: Mar. 2, 2016). The invention provides a zoledronic acid adjuvant and a vaccine containing the zoledronic acid adjuvant, that is, each vaccine dose contains 10 to 20 μg of the zoledronic acid adjuvant. The zoledronic acid adjuvant provided by the invention has low toxic and side effects, is safe and reliable to use within the dosage required for immunization, can effectively induce antigen-specific humoral immune responses, and has an immune effect similar to that of aluminum adjuvant, and its raw materials are easily available, and it has stable performance, and it can be used as an adjuvant for vaccines. Takuya SHISHIDO et al. invented a bisphosphonate-containing vaccine pharmaceutical composition that can induce the body to produce an efficient humoral immune response, and can be administered transdermally or mucosally (US patent, publication number: US 2017/0281759A1, publication date: Oct. 5, 2017).

Cai Hongzhi et al. (Chinese Journal of Biologicals, 2013, 26 (05): 608-610) studied the effect of zinc hydroxide and heparan sulfate (HS) composite adjuvant on the humoral immune response of mice induced by rabies vaccine, and the results indicated that the composite adjuvant of zinc hydroxide and HS could enhance the humoral immune response of mice induced by the rabies vaccine.

Chen Zhenpu et al. invented a zinc glycinate adjuvant and a vaccine containing the zinc glycinate adjuvant (Chinese Patent, publication (announcement) No. CN104096229A, publication (announcement) date: Oct. 15, 2014). The invention provides a zinc glycinate adjuvant and a vaccine containing the zinc glycinate adjuvant, that is, each vaccine dose contains 0.1 to 1 mg of zinc glycinate adjuvant dissolved in PBS of pH=6~8. The zinc glycinate adjuvant provided by the invention is a medicinal adjuvant, and also is a zinc nutrient fortifier. It has low toxic and side effects, is safe and reliable to use within the dosage required for immunization. It can effectively induce antigen-specific humoral immune responses, and the induced humoral immune response effect is better than that of the non-adjuvant group. The raw materials of the zinc glycinate adjuvant are easily available and are commercially available products. It has simple preparation process, low cost, stable performance, high biological potency, no toxic or harmful effects, and it can be added to a variety of traditional vaccines and genetic engineering vaccines as a vaccine adjuvant.

Mahsa Afshari et al. (Cytokine, 2016, 81:71-76) used a BALB/c mouse model with Leishmania infection. It was found that feeding mice orally with zinc sulfate could significantly reduce the parasite load and increase the expression level of Th1 cytokine mRNA. This indicates that zinc sulfate can induce a strong Th1 immune response in BALB/c mice infected with Leishmania.

SUMMARY OF THE INVENTION

In order to overcome the defects of existing vaccine aluminum adjuvants, that is, incapability of stimulating Th1 immune response and incapability of enhancing the immunogenicity of polypeptide and nucleic acid vaccines, and in view of the role of zoledronic acid in immune enhancement, a zinc zoledronate micro/nanoparticle adjuvant is formed by co-precipitation of zoledronic acid and the trace element zinc, which also plays an important role in immune regulation. Through a creative work, the inventors of the present invention found that the zinc zoledronate micro/nanoparticle adjuvant could significantly improve humoral immune response and cellular immune response. Hence, a zinc zoledronate vaccine adjuvant with significant immune-enhancing effects is provided.

Therefore, in one aspect, the present invention relates to a zinc zoledronate micro/nanoparticle adjuvant prepared by co-precipitation of zinc ion along with phosphonic acid groups, phosphate radicals and hydroxide radicals, which is referred to as zinc zoledronate adjuvant for short.

In a specific embodiment, the zinc zoledronate adjuvant of the present invention can be obtained by evenly mixing a soluble salt solution containing zinc ions with a zoledronic acid and a sodium hydroxide solution, or by evenly mixing a soluble salt solution containing zinc ions with a zoledronic acid, a sodium hydroxide and a sodium phosphate solution, to obtain the zinc zoledronate adjuvant.

In a specific embodiment, the mixing method includes, but is not limited to, sequential precipitation, separated precipitation followed by mixing, or co-precipitation.

In one embodiment, the molar concentration ratio of zinc:zoledronic acid in the zinc zoledronate adjuvant is generally not limited. In a preferred embodiment, the molar concentration ratio of zinc:zoledronic acid in the zinc zoledronate adjuvant may be (1-8):1. Preferably, the molar concentration ratio of zinc:zoledronic acid is selected from 1:1, 4:1 and 8:1.

In one embodiment, the zinc zoledronate adjuvant may also contain a phosphate. For example, a zinc zoledronate composite adjuvant is prepared by replacing the zoledronic acid with phosphate in a variety of molar proportions (not totally replaced), by means of a variety of mixing methods (e.g., sequential precipitation, separated precipitation followed by mixing, or co-precipitation and etc.). In such zoledronic zinc composite adjuvant, the molar concentration ratio of Zn:phosphate radical is generally not limited. In a preferred embodiment, the molar concentration ratio of Zn:phosphate radical can be (1-8):1. Preferably, the molar concentration ratio of Zn:phosphate radical is selected from 1.5:1 and 4:1, thus forming an organic-inorganic hybrid zinc zoledronate adjuvant.

In another embodiment of the zinc zoledronate adjuvant, the zinc zoledronate adjuvant may further comprise aluminum (Al); for example, a zinc zoledronate-aluminum adjuvant is prepared by replacing Zn with Al in different proportions (not totally replaced), and by means of a variety of mixing methods (e.g., sequential precipitation, separated precipitation followed by mixing, or co-precipitation, etc.). In such zinc zoledronate-aluminum adjuvant, the molar concentration ratio of Zn:Al is generally not limited. In a preferred embodiment, the molar concentration ratio of Zn:Al may be (0.02-1):1, and preferably, the molar concentration ratio of Zn:Al is selected from 0.375:1, 0.5:1 and 0.8:1.

In one embodiment, the specific type of zinc compound is not limited, for example, zinc hydroxide, zinc phosphate, zinc sulfate, zinc carbonate or other types of zinc adjuvants known in the art are acceptable, as long as the zinc zoledronate adjuvant is prepared by precipitation of zinc ion and phosphonic acid groups, phosphate radicals and hydroxide radicals.

In one embodiment, the phosphate solution may be selected from, but not limited to, sodium phosphate, disodium hydrogen phosphate (anhydrous, dihydrate, heptahydrate, dodecahydrate), sodium dihydrogen phosphate (anhydrous, dihydrate), potassium phosphate, dipotassium hydrogen phosphate, potassium dihydrogen phosphate, pyrophosphate, polyphosphoric acid, and any mixtures thereof.

In one embodiment, the specific type of aluminum compound is not limited, for example, aluminum hydroxide, aluminum phosphate, aluminum sulfate or other aluminum adjuvant types known in the art are acceptable, as long as the zinc zoledronate-aluminum adjuvant is prepared by precipitation of zinc and aluminum ions with phosphonic acid groups, phosphate radicals and hydroxide radicals.

In one aspect, the present invention relates to a method for preparing a zinc zoledronate adjuvant, which comprises:
  precipitating zinc ions through reacting of the zinc ions with phosphonic acid groups, phosphate radicals and hydroxide radicals separately or simultaneously in a soluble salt solution, thereby preparing the zinc zoledronate adjuvant.

In a specific embodiment, the method comprises:
a) providing a soluble salt solution containing zinc ions,
b) evenly mixing the soluble salt solution of step a) with a zoledronic acid, a sodium hydroxide or evenly mixing the soluble salt solution of step a) with a zoledronic acid, a sodium hydroxide and a sodium phosphate solution, in a manner of sequential precipitation, separated precipitation followed by mixing, or co-precipitation, to obtain the zinc zoledronate adjuvant.

In embodiments of the present invention, the soluble salt solution is generally not limited, for example, may be selected from a solution of hydrochloric acid.

In a preferred embodiment, the method further comprises sterilizing the zinc zoledronate adjuvant suspension formed after mixing in step b) by autoclaving at a high temperature high pressure condition of 121° C. for 60 minutes, cooling to room temperature and then letting stand at 2° C. to 8° C., preferably storing at 4° C. for later use. In one embodiment, the molar concentration ratio of zinc:zoledronic acid in the zinc zoledronate adjuvant obtained by the method of the present invention may be 1-8:1. In a preferred embodiment, the molar concentration ratio of zinc:zoledronic acid is selected from 1:1, 4:1 or 8:1.

In another embodiment, in the process of the method of the present invention for obtaining the zinc zoledronate-aluminum adjuvant, the zinc zoledronate-aluminum adjuvant is prepared by a precipitation of zinc ions and aluminum ions with phosphonic acid groups, phosphate radicals and hydroxide radicals by a variety of mixing methods (e.g., sequential precipitation, separated precipitation followed by mixing, or co-precipitation and etc.), in which the Zn/Al molar concentration ratio is set at 0.375:1, 0.5:1 and 0.8:1.

The soluble salt solution of zinc ions as used herein may be any soluble salt solution of zinc ions, and is preferably a hydrochloric acid solution of zinc ions.

The zoledronate solution as used herein is preferably an alkaline solution of zoledronic acid and sodium hydroxide.

The means for precipitation of zinc and phosphonic acid groups as used herein may be any means in which a precipitation reaction happens by thoroughly mixing the soluble salt solution of zinc ions and the alkaline solution of zoledronic acid and sodium hydroxide. Preferably, the zinc zoledronate adjuvant can be prepared by a method such as sequential precipitation, separated precipitation followed by mixing, or co-precipitation and etc.

The sterilization as used herein can be any method suitable for sterilizing zinc zoledronate adjuvant. For example, a high temperature high pressure steam sterilization technique may be applied. For example, sterilization is performed at 121° C. for 30-60 minutes, preferably 60 minutes.

In one embodiment, the present invention also relates to a method for measuring the physical and chemical properties of the zinc zoledronate adjuvant obtained. In one embodiment, the pH value, particle size, Zeta potential, point of zero charge (PZC) of particles, protein adsorption and dissociation rates, metal ion precipitation rate, organic phosphonic acid precipitation rate, in vivo and in vitro dissolution rates of the precipitates, etc., of the adjuvant are measured. The physical and chemical properties of the adjuvant can be measured by conventional techniques, for example, see U.S. Pat. No. 9,573,811; Ai Xulu et al., Analysis of physicochemical properties of three aluminum hydroxide adjuvant, "Chinese Journal of Biologicals", 2015, 28(1): 44-47; and as described in the examples herein.

In one embodiment, the zinc zoledronate adjuvant as described herein has one or more of the following properties: a pH of 8.0-9.0 before sterilization, a pH of 6.0-8.0 after sterilization, a particle size of 1-10 μm, a point of zero charge of particles of 4.0-11.4, a metal ion precipitation rate of >99%, and a protein adsorption rate of >80%.

In one aspect, the present invention relates to a composition, in particular a pharmaceutical formulation or composition, which comprises the zinc zoledronate adjuvant as described herein.

The method of preparing the pharmaceutical formulation or composition comprises a step of combining the zinc zoledronate adjuvant with the carrier and, optionally, one or more accessory ingredients.

Generally speaking, the formulations are prepared by uniformly and intimately combining the zinc zoledronate adjuvant with liquid carriers, or pulverized solid carriers, or both, and then, if necessary, shaping the product.

Liquid dosage forms for oral administration of the active ingredients include pharmaceutically acceptable emulsions, microemulsions, solutions, suspensions, syrups and elixirs. In addition to the zinc zoledronate adjuvant, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspension formulations, in addition to zinc zoledronate adjuvant, may contain suspending agents, for example, ethoxylated isostearyl alcohols, polyoxyethylene sorbitol and sorbitan esters, microcrystalline cellulose, aluminum metahydroxide, bentonite, agar-agar and gum tragacanth, and mixtures thereof.

The pharmaceutical composition of the present invention for rectal or vaginal administration can be provided as a suppository, which can be prepared by mixing the zinc zoledronate adjuvant with one or more suitable non-irritating excipients or carriers (including, for example, cocoa butter, polyethylene glycol, wax for suppository or salicylate), and which is solid at room temperature and liquid at body temperature, thereby melting in the rectum or vagina to release the zinc zoledronate adjuvant. The formulation suitable for vaginal administration of the present invention also include vaginal suppository, tampon, cream, gel, paste, foam or spray containing suitable carriers known in the art.

The pharmaceutical composition of the present invention suitable for parenteral administration comprises the zinc zoledronate adjuvant and one or more pharmaceutically acceptable sterile isotonic aqueous or non-aqueous carriers in combination with it, including solution, dispersion, suspension or emulsion or sterile powder that may be reconstituted into sterile injectable solution or dispersion prior to use, which may contain antioxidants, buffers, solutes which render the formulation isotonic with the blood of the intended recipient or suspending or thickening agents.

Examples of suitable aqueous and non-aqueous carriers which may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size (in the case of dispersions), and by the use of surfactants.

These compositions may also contain adjuvants such as wetting agents, emulsifying agents and dispersing agents. It may also be desirable to include isotonic agents, such as sugars, sodium chloride, and the like in the compositions. In addition, prolonged absorption of the injectable pharmaceutical form may be brought about by the inclusion of agents which delay absorption such as aluminum monostearate and gelatin.

Injectable depot forms can be made by forming microencapsule matrices of the zinc zoledronate adjuvant in biodegradable polymers (such as polylactide-polyglycolide). Depending on the ratio of the zinc zoledronate adjuvant to the polymer, and the nature of the particular polymer employed, the rate of release of the zinc zoledronate adjuvant can be controlled. Examples of other biodegradable polymers include poly(orthoesters) and poly(anhydrides). Depot injectable formulations are also prepared by entrapping the zinc zoledronate adjuvant in liposomes or microemulsions which are compatible with body tissue. The injectable materials can be sterilized for example, by filtration through a bacterial-retaining filter.

The formulations may be presented in unit-dose or multi-dose sealed containers (for example, ampoules and vials) and may be stored in a lyophilized condition requiring only the addition of the sterile liquid carrier, for example water for injection, immediately prior to use. Extemporaneous injection solutions and suspensions may be prepared from sterile powders, granules and tablets of the type described above.

In one aspect, the present invention also relates to an immunogenic composition comprising the zinc zoledronate adjuvant as described herein and one or more antigens.

The immunogenic composition as used herein, when administered to a subject or an animal, stimulates a protective immune response against said one or more antigens contained therein.

In one aspect, the present invention also relates to a vaccine composition comprising the zinc zoledronate adjuvant as described herein and one or more antigens.

The vaccine composition as used herein, when administered to a subject or animal, stimulates a protective immune response against, for example, a microorganism, or to efficaciously protect the subject or the animal against infection.

The vaccine composition may be used to prevent or ameliorate a pathological condition that will respond favorably to immune response modulation. Such vaccine composition may be a prophylactic vaccine or a therapeutic vaccine. Preferably, the vaccine composition includes a genetically engineered vaccine, such as a protein vaccine, such as a varicella-zoster virus recombinant protein vaccine.

In one aspect, the present invention also relates to a vaccine adjuvant comprising the zinc zoledronate adjuvant as described herein. For example, such vaccine adjuvant may also include a secondary adjuvant as described below.

The term "adjuvant" or "vaccine adjuvant" as used herein refers to a substance capable of non-specifically accelerating, prolonging or enhancing an immune response against an antigen.

Advantageously, adjuvants can also reduce the number of immunization times or the amount of antigen required for protective immunity.

It is well known that an adjuvant itself will not or hardly stimulate an immune response, but an adjuvant will increase the immune response against the antigen. Therefore, the zinc zoledronate adjuvant of the present invention can be combined with one or more antigens to produce an immunogenic composition or vaccine that may be used to stimulate an immune response in an individual. A variety of substances may be used as antigens in a complex or formulation, of immunogenic or vaccine type. For example, attenuated and inactivated viral and bacterial pathogens, purified macromolecules, proteins, polysaccharides, toxoids, recombinant antigens, organisms containing a foreign gene from a pathogen, synthetic peptides, polynucleotides, antibodies and tumor cells, etc. Antigens may be used in both preventive and therapeutic vaccines. Antigens include protein antigens, such as varicella-zoster virus gE glycoprotein antigen (VZV gE).

A variety of immunomodulatory molecules can also be used in combination with the zinc zoledronate adjuvant of the present invention, to alter an immune response in an individual. The immunomodulators described herein refer to a class of formulations that can regulate, balance and restore the body's immune function. Commonly used immunomodulators include three major categories, which are immune promoters, immunosuppressants, and immune bidirectional modulators.

The amounts of antigen and zinc zoledronate adjuvant in the vaccine composition of the present invention and the administered dose thereof are determined by techniques well known to those skilled in the pharmaceutical field, in which factors such as the following should be considered: specific antigen, age, sex, weight, specie and condition of specific animal or patient, and administration route.

In a preferred embodiment, the vaccine composition of the present invention further comprises one or more components selected from the group consisting of: surfactants, absorption promoters, water absorbing polymers, substances which inhibit enzymatic degradation, alcohols, organic solvents, oils, pH controlling agents, preservatives, osmotic pressure controlling agents, propellants, water and any mixture thereof.

The vaccine composition of the present invention may further comprise a pharmaceutically acceptable carrier. The amount of the carrier will depend upon the amounts selected for the other ingredients, the desired concentration of the antigen, the selection of the administration route (oral or parenteral), etc. The carrier can be added to the vaccine at any convenient time. In the case of a lyophilized vaccine, the carrier can, for example, be added prior to administration. Alternatively, the final product can be manufactured with the carrier.

Examples of appropriate carriers include, but are not limited to, sterile water, saline, buffers, phosphate-buffered saline, buffered sodium chloride, vegetable oils, Minimum Essential Medium (MEM), MEM with HEPES buffer, etc.

Optionally, the vaccine composition of the invention may contain conventional, secondary adjuvants in varying amounts depending on the adjuvant and the desired result.

Examples of suitable secondary adjuvants include, but are not limited to, stabilizers; emulsifiers; pH adjusters such as sodium hydroxide, hydrochloric acid, etc.; surfactants such as Tween® 80 (polysorbate 80, commercially available from Sigma Chemical Co., St. Louis, Mo.); liposomes; iscom adjuvant; synthetic glycopeptides such as muramyl dipeptides; extenders such as dextran; carboxypolymethylene; bacterial cell walls such as mycobacterial cell wall extract; their derivatives such as *Corynebacterium parvum; Propionibacterium acne; Mycobacterium bovis*, for example, Bovine Calmette Guerin (BCG); vaccinia or animal poxvirus proteins; subviral particle adjuvants such as orbivirus; cholera toxin; N,N-dioctadecyl-N',N'-bis(2-hydroxyethyl)-propanediamine (pyridine); monophosphoryl lipid A; dimethyldioctadecylammonium bromide (DDA, commercially available from Kodak, Rochester, N.Y.); synthetics and mixtures thereof.

Examples of suitable stabilizers include, but are not limited to, sucrose, gelatin, peptone, digested protein extracts such as NZ-Amine or NZ-Amine AS. Examples of emulsifiers include, but are not limited to, mineral oil, vegetable oil, peanut oil and other standard, metabolizable, nontoxic oils useful for injectables or intranasal vaccines compositions.

For the purpose of this invention, these adjuvants are identified herein as "secondary" merely to contrast with the above-described zinc zoledronate adjuvant, because the combination of the zinc zoledronate adjuvant and the antigenic substance can significantly increase the humoral immune response to the antigenic substance. The secondary adjuvants are primarily included in the vaccine formulation as processing aids, although certain adjuvants do possess immunologically enhancing properties to some extent and have a dual purpose.

Conventional preservatives can be added to the vaccine composition in effective amounts ranging from about 0.0001% to about 0.1% by weight. Depending on the preservative employed in the formulation, amounts below or above this range may be useful. Typical preservatives include, for example, potassium sorbate, sodium metabisulfite, phenol, methyl paraben, propyl paraben, thimerosal, etc.

The choice of inactivated, modified or other type of vaccine composition and preparation of the improved vaccine composition formulation of the present invention are known or readily determined by those of ordinary skill in the art.

As a general rule, the vaccine composition of the present invention can be conveniently administered orally, parenterally (subcutaneously, intramuscularly, intravenously, intradermally or intraperitoneally), intrabuccally, intranasally, or transdermally. The route of administration contemplated by the present invention will depend upon the antigenic substance and the co-formulants. For instance, if the vaccine composition contains saponins, while non-toxic for oral or intranasal administration, care must be taken not to inject the sapogenin glycosides into the blood stream as they function as strong hemolytics. Also, many antigens will not be effective if taken orally. Preferably, the vaccine composition is administered intramuscularly or intraperitoneally.

The dosage of the vaccine composition will be dependent notably upon the selected antigen, the route of administration, species and other standard factors. It is contemplated that a person of ordinary skill in the art can easily and readily titrate the appropriate dosage for an immunogenic response for each antigen, to determine the effective immunizing amount and administration route.

As a vaccine adjuvant, the zinc zoledronate adjuvant of the present invention can improve the effectiveness of the vaccine by enhance the immunogenicity of weaker antigens (e.g., highly purified or recombinant antigens), by reduce the amount of antigens required for immune response, or by reduce the immunization frequency required for protective immunization. The zinc zoledronate adjuvant of the present invention can improve the effectiveness of the vaccine in individuals (e.g., neonates, elderly, and immunocompromised individuals) with reduced or weakened immune responses and can enhance the effectiveness of the vaccine in target tissues. Alternatively, the zinc zoledronate adjuvant of the present invention can promote cell-mediated immunity and/or humoral immunity by triggering a specific cytokine profile.

The combination of an antigen and/or immunomodulatory molecule and the zinc zoledronate adjuvant of the present invention can be tested in a variety of preclinical toxicological and safety studies well known in the art.

For example, such a combination can be evaluated in an animal model in which the antigen has been found to be immunogenic and that can be reproducibly immunized by the same route proposed for human clinical testing.

The combination of antigen and/or immunomodulatory molecule and the zoledronic acid adjuvant of the present invention can be tested, for example, by an approach set forth by the Center for Biologics Evaluation and Research/ Food and Drug Administration and National Institute of Allergy and Infectious Diseases (Goldenthal, K L et al. AID Res Hum Retroviruses, 9: S45-9 (1993)).

Those skilled in the art will know how to determine, for a particular combination of antigen and/or immunomodulatory molecule with the composite adjuvant of the invention, the appropriate antigen payload, route of immunization, dose, purity of antigen, and vaccination regimen useful to treat a particular pathological condition in a particular animal species.

The immunogenic composition or a vaccine of the invention, for inducing an immune response, can be administered as a solution or suspension together with a pharmaceutically acceptable medium.

Such a pharmaceutically acceptable medium may be, for example, water, phosphate buffered saline, normal saline or other physiologically buffered saline, or other solvent or vehicle such as glycol, glycerol, and oil such as olive oil or an injectable organic ester. A pharmaceutically acceptable medium can also contain liposomes or micelles, and can contain immunostimulating complexes prepared by mixing polypeptide or peptide antigens with detergent and a glycoside (such as Quil A).

The immunogenic composition or vaccine of the invention can be administered by a variety of routes to stimulate an immune response. For example, the immunogenic composition or vaccine can be delivered subcutaneously, intradermally, intralymphatically, intramuscularly, intratumorally, intravesically, intraperitoneally and intracerebrally.

Those skilled in the art will know how to select appropriate delivery routes for particular formulations of the zoledronic acid adjuvant of the invention.

In a preferred embodiment of the present invention, the vaccination method for the treatment or prevention of infection in a mammal comprises use of the vaccine of the present invention, in which the vaccine will specifically be administered intramuscularly or intraperitoneally. The vaccine may be administered as a single dose, or preferably administered several times, for example, two, three or four times, per week or per month according to the primary immunization/booster immunization strategy. The appropriate dose depends on a variety of parameters.

In one aspect, the present invention also relates to a use of the zinc zoledronate adjuvant as described herein for the manufacture of a vaccine adjuvant, pharmaceutical composition, immunogenic composition or vaccine composition. Preferably, the vaccine comprises protein vaccine, such as varicella-zoster virus protein recombinant vaccine.

SPECIFIC MODELS FOR CARRYING OUT THE PRESENT INVENTION

The following describes the embodiments of the present invention in detail in conjunction with the examples. For those not indicating specific conditions in the examples, they shall be carried out in accordance with the conventional conditions or the conditions suggested by the manufacturer. The reagents or instruments used without the manufacturer's indication are all conventional products that can be purchased commercially.

The materials used in the following preparation examples are as follows:

Anhydrous zinc chloride ($ZnCl_2$): purchased from Xilong Chemical;
Aluminum chloride hexahydrate ($AlCl_3 \cdot 6H_2O$): purchased from Xilong Chemical;
Disodium hydrogen phosphate dodecahydrate ($Na_2HPO_4 \cdot 12H_2O$): purchased from Xilong Chemical;
Sodium hydroxide (NaOH): purchased from Xilong Chemical;
Zoledronic acid ($C_5H_{10}N_2O_7P_2$): purchased from Hunan Huateng Pharmaceutical Co., Ltd.

Preparation Example 1: Preparation of Zn-Zoledronic Acid (1/0.25) Adjuvant

According to a Zn/zoledronic acid molar concentration ratio of 1:0.25, 50 mL of a 31.11 mM zinc chloride solution was prepared and defined as Solution A; 50 mL of a solution (7.78 mM zoledronic acid+43 mM sodium hydroxide+7.78 mM disodium hydrogen phosphate) was prepared and defined as Solution B. Solution A and Solution B were filtered with 0.22 μm filter membrane for later use.

Preparation of Zn-Zoledronic Acid (1/0.25) Adjuvant Suspension

Figure 1:
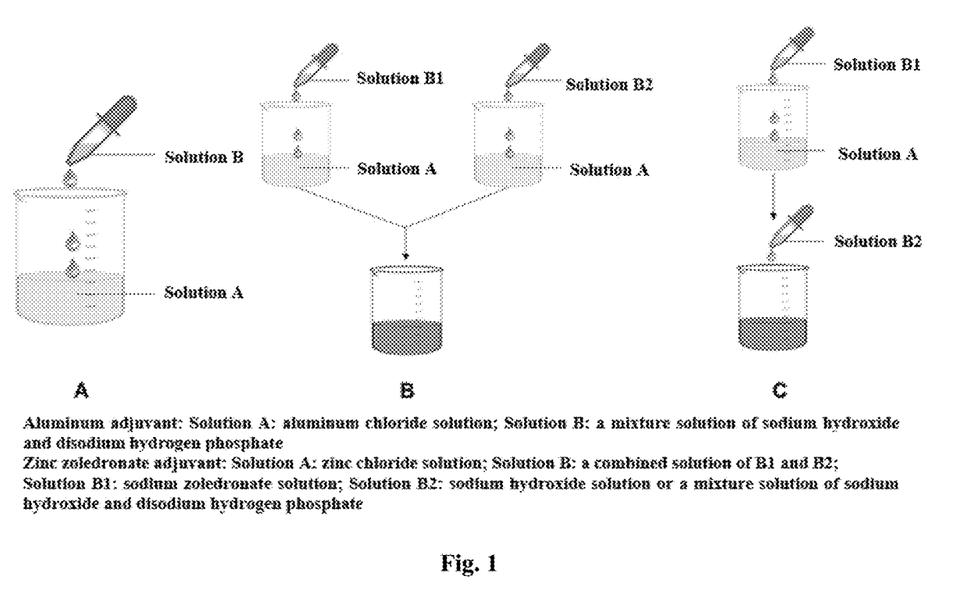
FIG. 1: schematic diagrams of three preparation processes for preparing the adjuvants.

Solution A and B were used to form a zinc zoledronate adjuvant suspension according to the scheme as shown in FIG. 1A, that was, the prepared Solution B was added dropwise according to a volume ratio of 1:1 to Solution A to form a suspension until all was added.

The zinc zoledronate adjuvant obtained after mixing according to FIG. 1A was subjected to an autoclave steam sterilization at 121° C. for 60 min, and then was cooled to room temperature, and then stored at 2° C. to 8° C.

Preparation Example 2: Preparation of Zn-Zoledronic Acid (1/1) Adjuvant

Preparation of Solutions

According to a Zn/zoledronic acid molar concentration ratio of 1:1, 50 mL of a 31.11 mM zinc chloride solution was prepared and defined as Solution A; 50 mL of a solution (31.11 mM zoledronic acid+87 mM sodium hydroxide) was prepared and defined as Solution B. Solution A and Solution B were filtered with 0.22 μm filter membrane for later use.

Referring to Preparation Example 1, the Zn-zoledronic acid (1/1) adjuvant suspension was prepared.

Preparation Example 3: Preparation of Zinc-Aluminum Zoledronate (FH-001-Zoledronic Acid) Adjuvant Preparation of Solutions According to an Al/Zn molar concentration of 1:0.375, 50 mL of a mixture solution of aluminum chloride (122.44 mM) and zinc chloride (46.66 mM) was prepared and defined as Solution A; 50 mL of a solution (18.66 mM zoledronic acid+380 mM sodium hydroxide) was prepared and defined as Solution B. Solution A and Solution B were filtered with 0.22 μm filter membrane for later use.

Referring to Preparation Example 1, the FH-001-zoledronic acid adjuvant suspension was prepared.

Preparation Example 4: Preparation of Aluminum Zoledronate (Al-001-Zoledronic Acid) Adjuvant Preparation of Solutions According to an Al/Zol molar concentration of 1:0.075, 50 mL of 122.44 mM aluminum chloride solution was prepared and defined as Solution A; 50 mL of a solution (9.33 mM zoledronic acid+9.33 mM disodium hydrogen phosphate dodecahydrate+370 mM sodium hydroxide) was prepared and defined as Solution B. Solution A and Solution B were filtered with 0.22 μm filter membrane for later use.

Referring to Preparation Example 1, the Al-001-zoledronic acid adjuvant suspension was prepared.

Preparation Example 5: Preparation of Zn-Zoledronic Acid (1/0.125)

Preparation of Solutions

According to a Zn/zoledronic acid molar concentration ratio of 1:0.125, 50 mL of 124.44 mM zinc chloride solution was prepared and defined as Solution A; 50 mL of a solution (15.56 mM zoledronic acid+65.7 mM sodium hydroxide) was prepared and defined as Solution B. Solution A and Solution B were filtered with 0.22 μm filter membrane for later use.

Referring to Preparation Example 1, the Zn-zoledronic acid (1/0.125) adjuvant suspension was prepared.

Preparation Example 6: Preparation of Aluminum Adjuvant (Al-002)

Preparation of Solutions

Aluminum chloride hexahydrate was added to water to prepare 0.5 L of a 62.22 mM aluminum chloride solution and defined as Solution A; disodium hydrogen phosphate dihydrate and sodium hydroxide were added to water to prepare 0.5 L of a solution containing 18.68 mM phosphate and 0.12 M sodium hydroxide and defined as Solution B. They were filtered with 0.22 μm filter membrane for later use.

Referring to Preparation Example 1, the aluminum adjuvant Al-002 was prepared.

Preparation Example 7: Preparation of Aluminum Adjuvant (Al-001-840)

Preparation of Solutions

According to a phosphate/Al molar concentration ratio of 0.15, 0.5 L of a 124 mM aluminum chloride solution was prepared and defined as Solution A; 0.5 L of an 18.6 mM disodium hydrogen phosphate solution was prepared and defined as Solution B. Solution B further contained 150 mM sodium hydroxide. They were filtered with 0.22 μm membrane filter for later use.

Referring to Preparation Example 1, the aluminum adjuvant Al-001-840 suspension was prepared.

Preparation Example 8: Preparation of Zinc-Aluminum Adjuvant (FH-001)

Preparation of Solutions

Aluminum chloride hexahydrate and anhydrous zinc chloride were added to water to prepare 0.25 L of a solution containing 124.44 mM aluminum chloride and 46.68 mM zinc chloride, which was defined as Solution A; disodium hydrogen phosphate dihydrate and sodium hydroxide were added to water to prepare 0.25 L of a solution containing 18.68 mM phosphate and 0.425 M sodium hydroxide, which defined as solution B. They were filtered with 0.22 μm filter membrane for later use.

Preparation of Aluminum Composite Adjuvant

As shown in FIG. 1A, 0.25 L of Solution B was added dropwise to 0.25 L of Solution A until all was added, thereby obtaining the zinc-aluminum composite adjuvant FH-001. The obtained zinc-aluminum composite adjuvant was subjected to an autoclave steam sterilization at 121° C. for 60 min, and then was cooled to room temperature, and then stored at 2° C. to 8° C.

Preparation Example 9: Preparation of Zn-Etidronic Acid (1/0.25) Adjuvant

According to the Zn/etidronic acid molar concentration ratio of 1:0.25, 50 mL of a 31.11 mM zinc chloride solution was prepared and defined as Solution A; 50 mL of a solution (7.78 mM etidronic acid+34 mM sodium hydroxide+7.78 mM disodium hydrogen phosphate) was prepared and defined as Solution B. Solution A and Solution B were filtered with 0.22 μm filter membrane for later use.

Referring to Preparation Example 1, the Zn-etidronic acid (1/0.25) adjuvant suspension was prepared.

Preparation Example 10: Preparation of Zn-Clodronic Acid (1/0.25) Adjuvant

According to a Zn/clodronic acid molar concentration ratio of 1:0.25, 50 mL of a 31.11 mM zinc chloride solution was prepared and defined as Solution A; 50 mL of a solution (7.78 mM clodronic acid+36 mM sodium hydroxide+7.78 mM disodium hydrogen phosphate) was prepared and defined as Solution B. Solution A and Solution B were filtered with 0.22 μm filter membrane for later use.

Referring to Preparation Example 1, the Zn-clodronic acid (1/0.25) adjuvant suspension was prepared.

Preparation Example 11: Preparation of Zn-Alendronic Acid (1/0.25) Adjuvant

According to a Zn/alendronic acid molar concentration ratio of 1:0.25, 50 mL of a 31.11 mM zinc chloride solution was prepared and defined as Solution A; 50 mL of a solution (7.78 mM alendronic acid+36 mM sodium hydroxide+7.78 mM disodium hydrogen phosphate) was prepared and defined as Solution B. Solution A and Solution B were filtered with 0.22 μm filter membrane for later use.

Referring to Preparation Example 1, the Zn-alendronic acid (1/0.25) adjuvant suspension was prepared.

Preparation Example 12: Preparation of Zn-Pamidronic Acid (1/0.25) Adjuvant

According to a Zn/pamidronic acid molar concentration ratio of 1:0.25, 50 mL of a 31.11 mM zinc chloride solution was prepared and defined as Solution A; 50 mL of a solution (7.78 mM pamidronic acid+32 mM sodium hydroxide+7.78 mM disodium hydrogen phosphate) was prepared and defined as Solution B. Solution A and Solution B were filtered with 0.22 μm filter membrane for later use.

Referring to Preparation Example 1, the Zn-pamidronic acid (1/0.25) adjuvant suspension was prepared.

The present invention will be further described below in conjunction with examples.

Example 1: Determinations of Physical and Chemical Properties of Zinc Zoledronate Adjuvant The following determination methods were applicable to any Zn/zoledronic acid molar ratio, that was, any zinc zoledronate adjuvant, such as zinc zoledronate adjuvant doped with inorganic phosphoric acid or doped with Al.

(1) Observation of Morphology of the Adjuvant Particles

After the zinc zoledronate adjuvant was diluted 50 times with deionized water, the observation was performed with a JEM-2100 transmission electron microscope (TEM) of Japan Electronics. The specific steps were as follows: dropping the adjuvant sample on a copper mesh coated with carbon film, allowing 10 minutes for absorption, wiping off the residual liquid with filter paper, sending samples to the sample chamber of the transmission electron microscope to observe the morphology of the sample, and taking photos for further analysis.

Figure 2:
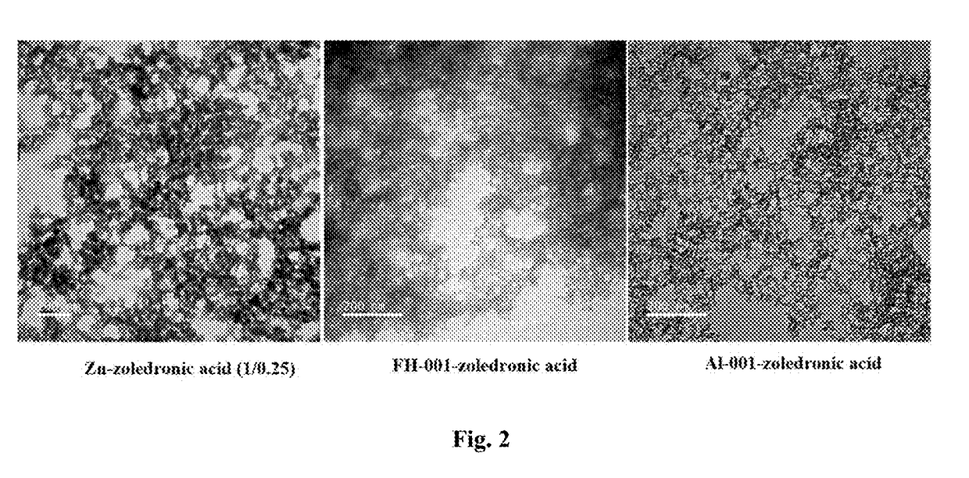
FIG. 2: morphologies of particles of zinc zoledronate adjuvant, zinc-aluminum zoledronate adjuvant, and aluminum zoledronate adjuvant.

Experimental results: it could be clearly seen that Zn-zoledronic acid (1/0.25) adjuvant and Al-001-zoledronic acid adjuvant had spherical nano-core particles, while FH-001-zoledronic acid adjuvant showed a laver cluster shape (FIG. 2).

(2) Determination of pH

The samples to be tested was taken, equilibrated at room temperature for at least 30 minutes, and measured with a Sartorius pH glass electrode.

Standard buffer (pH 7.00), standard buffer (pH 4.01) and standard buffer (pH 10.01) were selected to calibrate the instrument according to the requirements of the instruction manual.

The "Mode" button could be pressed to switch between pH and mV modes. Usually, the pH mode was selected when determining the pH value of a solution.

The "SETUP" button was pressed until the display showed Clear buffer, and then the "ENTER" button was pressed to confirm and clear the previous calibration data.

The "SETUP" button was pressed until the display showed the buffer solution group "4.01, 7.00, 10.01", and then the "ENTER" button was pressed to confirm.

The electrode was taken out of the electrode storage solution carefully, the electrode was rinsed thoroughly with deionized water, and the water on the surface was dried with filter paper after well rinsed (be careful not to wipe the electrode).

The electrode was immersed in the first buffer solution (pH 7.00), until the value was stable and "S" appeared, then the "STANDARDIZE" button was pressed, until the instrument was automatically calibrated. After the calibration was successful, "7.00" and the electrode slope were displayed.

The electrode was taken out from the first buffer solution, and the electrode was rinsed thoroughly with deionized water, and the electrode was immersed in the second buffer solution (pH 4.01) in sequence, until the value was stable and "S" appeared, then the "STANDARDIZE" button was pressed, until the instrument was calibrated automatically. After the calibration was successful, "4.01 7.00" and the message "Slope" displayed. Slope displayed the measured electrode slope value, which was acceptable in the range of 90-105%.

If there was a big deviation from the theoretical value, an error message (Err) would be displayed, then the electrode should be cleaned, and the above steps should be repeated for calibration.

The above operations were repeated to complete the third point (pH 10.01) calibration.

After the calibration was completed, the electrode was rinsed thoroughly with deionized water, and then dried gently with filter paper. The sample solution was shaken evenly, the glass electrode was immersed in the sample solution, until the pH value change no more than ±0.05 within 1 minute, and then the reading was confirmed.

The sample solution was shaken evenly and the measurement was carried out again. The difference between the two pH values should not exceed 0.1. The average of the two readings was taken as the pH value of the test product.

Experimental Results (Table 1)

The pH range of Zn-zoledronic acid adjuvants were 8.0 to 9.0 before sterilization, and were 6.5 to 7.0 after sterilization.

(3) Determination of Particle Size

Beckman LS 13320 laser particle size analyzer was turned on and warmed up for 15 minutes.

The analyzer control software were started and the closed compartment of the sample cell were opened, the sample cell was taken from the sample tank and added with 12 mL of purified water.

The sample cell was placed on the sample tank and the compartment door was closed.

"start cycle" was clicked, "Measure Offsets", "Align", "Measure Background" were selected in turn, and finally "start" was clicked, "OK" in the pop-up dialog box was clicked to start the calibration of blank background.

The sample cell was taken out, and added with a certain amount of standard sample (come with the analyzer); "start cycle" was clicked, "Measure Loading", "Enter Sample Info", "Enter run setting", "start runs" were selected in turn, and finally "start" was clicked, the name of the standard sample was input in the pop-up dialog box, "OK" was clicked when "Obscuration" parameter in the software was 8% to 12%, so the measurement of the standard sample was carried out.

In order to ensure the accuracy and reliability of the experimental data, the blank background should be calibrated and the size of the standard sample should be measured before each measurement was performed.

The closed compartment of the sample cell was opened and the sample cell was taken out.

The aqueous solution containing the standard sample in the sample cell was discarded, and deionized water was added into the sample cell to clean the sample cell 3 times.

After cleaning, 12 mL of deionized water was added, and the sample cell was placed on the sample tank, and the compartment door was closed.

"start cycle" was clicked, "Measure Offsets", "Align", "Measure Background" were selected in turn, and finally "start" was clicked, "OK" in the pop-up dialog box was clicked to start the calibration of blank background.

The sample cell was taken out, added with a certain volume of a test sample, the sample test compartment door was opened, the sample cell was placed on the sample tank and the compartment door was closed.

"start cycle" was clicked, "Enter Sample Info", "Enter run setting", "start runs" were selected in turn, and finally "start" was clicked, the name of the standard sample was input in the pop-up dialog box, "OK" was clicked when "Obscuration" parameter in the software was 8% to 12%, the particle sizes of samples that were measured were recorded.

Experimental Results

The particle size of the zinc zoledronate adjuvants was between 0.4 to 30 μm, and most of the particles were 6 to 7 μm in size.

TABLE 1 pH/particle size of several batches of Zn-zoledronic acid (1/0.25) adjuvant

| Adjuvant type | Batch | pH | Particle size (μm) |
|---|---|---|---|
| Zn-zoledronic | 2018041802 | 6.73 | 6.6 |
| acid | 2018041803 | 6.78 | 6.6 |
| (1/0.25) | 2018042501 | 6.62 | 6.4 |

(4) Determination of Adsorption Rate

Plotting standard curve for BSA standard: 150 mM NaCl was used as dilution buffer, the BSA standard (2 mg/mL) was serially diluted, and the absorbance at 280 nm was detected with UV2100 pro. The OD280 showed a high accuracy at 0.2-0.8 (broaden to 0.2-1.5).

BSA gradient dilution (EP): 150 mM NaCl was used as dilution buffer, a certain amount of BSA sample was weighed and diluted to the concentration gradient specified in EP: 0.5 mg/mL, 1 mg/mL, 2 mg/mL, 3 mg/mL, 5 mg/mL, 10 mg/mL, for later use.

BSA was mixed with adjuvant under BSA:adjuvant=3:1 (volume ratio), which was set as the usage condition for the measurement of adsorption rate; after the adjuvant was shaken evenly, it was mixed with different concentrations of BSA according to the experimental conditions, and the adsorption at room temperature was performed for 1 hour, and shaking was performed 5 times during the period; a centrifugation was performed at 13000 rpm/min for 3 minutes, the supernatant was taken afterwards, for later use.

Determination of protein concentration: Lowry method was used to determine the protein concentration in EP. In this experiment, according to the practical situation, UV2100 pro was used to directly determine the absorbance of the supernatant at 280 nm, the reading was kept between 0.2-0.8, otherwise the supernatant should be diluted.

Calculation of adsorption rate: adsorption rate=[1−$OD_{280(supernatant\ dilution\ factor\ X)}$/$OD_{280(when\ the\ adsorption\ rate\ of\ dilution\ X\ is\ 0)}$]*100

The experimental results were as follows:

TABLE 2

Protein adsorption capacity of several batches of Zn-zoledronic acid (1/0.25) adjuvant

| Batch | Absorption capacity (%) | | | | | |
|---|---|---|---|---|---|---|
| BSA(mg/mL) | 0.5 | 1 | 2 | 3 | 5 | 10 |
| Lot 2018041802 | 97 | 92 | 59 | 42 | 25 | 20 |
| Lot 2018041803 | 99 | 90 | 55 | 42 | 26 | 17 |
| Lot 2018041804 | 96 | 78 | 50 | 48 | 27 | 19 |

(5) Determination of PZC:

Instrument for measurement: Nanobrook Omni (Brookhaven)

Experimental operation: 0.1M NaOH/1% $HNO_3$ were used to adjust the pH of Zn-zoledronic acid (1/0.125) to: 6.00/5.50/5.00/4.50/4.00/3.50/3.00/2.50/2.00.

Passivated electrode: 3-4 mL of the adjuvant was added to the sample tube. After the electrode was inserted, the cycle in the SOP was set to 50, and the instrument was run to passivate the electrode.

Sample measurement: After the electrode was taken out, its lower end was rinsed with deionized water, and then the corresponding sample was added, the cycle was set to 15 in the SOP, the measure was set to 3, the pH was set to the corresponding pH of each sample, and the instrument was run.

Data processing: the corresponding Zeta potentials under different pH values were got, the software that came with the instrument was run to get the PZC values.

Results: The PZC of Zn-zoledronic acid (1/0.125) adjuvant was 4.08.

Example 2: Determination of Zinc Precipitation Rate of Zn-Zoledronic (1/0.125) Adjuvant The flame method (D2 lamp background correction) was used to determine the zinc content in the zinc zoledronate adjuvants and the determination procedure was standardized. The detection instrument was an atomic absorption spectrophotometer: Shimadzu AA6300C (P/N 206-52430).

Preparation of standard solution and sample to be determined: preparation of standard curve: the original concentration of zinc standard was 500 μg/mL, and it was diluted with 0.1 M hydrochloric acid solution to obtain 500 ng/mL, 1000 ng/mL, 1500 ng/mL, 2000 ng/mL and 2500 ng/mL standards.

The Zn-zoledronic acid (1/0.125) adjuvant was centrifuged at 13000 r/min for 10 min and the supernatant was removed. The sample was diluted 5 times with 0.1M nitric acid solution for determination, and a vortex mixer was used for shaking and mixing well. The determination process was as follows:

Operation method of AA-6300C and usage of WizAArd software:

Power turning on: the computer, AA-6300C power switch, air compressor switch (the pressure was set at 0.35 MPa), and ventilation system switch were turned on;

Acetylene opening: the acetylene valve was slowly opened to ensure that the primary pressure was 0.5 MPa and the secondary pressure was 0.1 MPa;

Basic operation procedure of WizAArd software: log in WizAArd→select element→at "unconnected instrument/send parameter" page, click <connect/send parameter>→set in "instrument initialization" page→check and tick each of items in "flame analysis instrument check catalog", click <OK>→set wavelength [213.86], slit width [0.7], lighting method [emission], [lamp position setting] in "optical parameters" page to ensure the actual position and preset position of the Zn hollow cathode lamp be identical, select [lamp on]→line search→burner origin position adjustment→select [parameter] in the menu bar→[edit parameter]→change the lighting method to <BGC-D2>→line search→ignition: after ensuring that C2H2 was turned on and the pressure met the requirements, press the PURGE and IGNITE buttons on the host at the same time until ignition→auto zero→set the blank group (BLK), standard product (STD), and test sample (UNK) on the MRT worksheet, input the theoretical concentration of the standard and the name of the sample, and manually load the sample through the sample tube extended from the nebulizer, set the sample volume at least 1 mL each time, select [start] to test→stop the flame→save the data and disconnect the instrument from the computer→shut down;

Test results:

TABLE 3

Drawing of standard curve of zinc concentration and Abs

| | Concentration of Zinc standard (X, ng/mL) | | | | | |
|---|---|---|---|---|---|---|
| | 0 | 500 | 1000 | 1500 | 2000 | 2500 |
| Abs (y) | 0.017 | 0.093 | 0.161 | 0.248 | 0.314 | 0.379 |
| Standard curve formula | $y = 0.0001x + 0.0191$, $R^2 = 0.9984$ | | | | | |

TABLE 4

Test results of zinc precipitation rate in Zn-zoledronic acid (1/0.125) adjuvant

| Sample | Abs | Zinc content of supernatant (µg/mL) | Total zinc content of adjuvant (µg/mL) | Zinc precipitation rate (%) |
|---|---|---|---|---|
| Zn-zoledronic acid (1/0.25) | 0.165 | 7.3 | 4067 | 99.82 |

Example 4: Determination of Zoledronic Acid Precipitation Rate of Zn-Zoledronic Acid (1/0.125) Adjuvant Method: UV spectrophotometry, instrument: UV800 (Beckman coulter).

Zoledronic acid has an imidazole ring and has a maximum absorption peak at 215 nm. The specific process for measuring the supernatant of the zoledronic acid of the adjuvant at 215 nm by an ultraviolet spectrophotometer was as follows:

First, 0.04 mg/mL, 0.03 mg/mL, 0.02 mg/mL, 0.015 mg/mL, 0.0075 mg/mL, 0.00375 mg/mL of standard zoledronate sodium solutions were prepared with physiological saline, and their $OD_{215}$ values were measured at a wavelength of 215 nm, and a standard curve was plotted. At the same time, we centrifuged Zn-zoledronic acid (1/0.125) at 13000 rpm for 10 minutes and took the supernatant afterward. The absorbance of the zoledronate sodium in the supernatant was measured at a wavelength of 215 nm. The results were as follows:

TABLE 5

Sodium zoledronate concentration and $OD_{215}$ standard curve

| | concentration of zoledronate sodium standard (x, mg/mL) | | | | | |
|---|---|---|---|---|---|---|
| | 0.00375 | 0.0075 | 0.015 | 0.02 | 0.03 | 0.04 |
| $OD_{215}$ (y) | 0.0517 | 0.1039 | 0.1944 | 0.2669 | 0.3931 | 0.5183 |
| Standard curve plotting | $y = 12.876x + 0.0053$, $R^2 = 0.9997$ | | | | | |

TABLE 6

Measurement results of zoledronic acid precipitation rate of Zn-zoledronic acid (1/0.125) adjuvant

| Sample | $OD_{215}$ | Content of Zoledronic acid in supernatant (µg/mL) | Content of total zoledronic acid in adjuvant (µg/mL) | Zoledronic acid precipitation rate (%) |
|---|---|---|---|---|
| Zn-zoledronic acid (1/0.125) | 0.0359 | 2.4 | 2373 | 99.89% |

Example 5: Determination of Adjuvant Activity of Zn-Zoledronic Adjuvant in Recombinant Protein VZV gE Vaccine The prepared zinc zoledronate adjuvants (also known as Zn-zoledronic acid) were used as an adjuvant, in which the Zn/zoledronic acid molar concentration ratio was 1:0.25 or 1:1. As adjuvants, they were used in combination with VZV gE antigen and together they were injected intramuscularly into mice, and the specific antibody titers produced were measured. The specific method was as follows:

Experimental animals: Balb/C mice, 6-8 weeks, 5 mice/group, female.

Drug concentration: antigen: 50 µg/ml;

Dosage: 5 µg/50 µl/mouse; aluminum adjuvant: 50 µl/mouse; zinc zoledronate adjuvant: 50 µl/mouse;

Experimental groups: (1) basic aluminum adjuvant group (A1-002); (2) Zn-zoledronic acid (1/0.25); (3) Zn-zoledronic acid (1/1);

Immunization protocol: At 2 weeks after the first immunization of the animals according to the immunization grouping, blood samples were collected from the eye socket to determine the antibody titer in serum. The antibody titer was measured in the second week after the first immunization. A booster immunization was given in the second week. At 2 weeks after the booster immunization, blood samples were collected from the eye socket to determine the antibody titer in serum, and a third immunization was given. After 2 weeks, the antibody titer in serum was determined by ELISA.

Determination of antibody binding titer by enzyme-linked immunosorbent assay (ELISA):

1. Antigen coating solution: 1× PB 7.4 buffer solution (4.343 g of $Na_2HPO_4 \cdot 7H_2O$; 0.456 g of $NaH_2PO_4$).
2. Washing solution: PBST, Beijing Wantai ELISA kit
3. Blocking solution: 2× ED (Enzyme Dilution): 1×PBS+ 0.5% casein+2% gelatin+0.1% preservative (proclin-300), diluted to 1× with ultrapure water or distilled water for sealing and sample dilution.
4. Color development solution A: Beijing Wantai ELISA kit.
5. Color development solution B: Beijing Wantai ELISA kit.
6. Stop solution: Beijing Wantai ELISA kit.

Experiment Procedure (1) Coating plate: VZV gE antigen was diluted with PB7.4 coating buffer solution to a certain concentration, usually 100 ng/well, added to a 96-well polystyrene plate by 100 µL/well, and the plate was coated overnight at 4° C.
(2) Blocking: the coating solution in the well was discarded, the plate was washed with PBST washing solution once, spin-dried, added with the blocking solution by 200 µL/well, and blocking was performed for 4 hours at room temperature.

(3) Adding serum of a certain degree of dilution: the blocking solution in the well was discarded, the plate was washed with PBST once, spin-dried, the first well was added with the serum to be tested by 150 µL/well, each of the following well was added with ED diluent by 100 µL/well, diluted at a gradient of 3 times, incubated and reacted at 25° C. for 1 h.

(4) Adding enzyme-labeled antibody (GAM-HRP): the serum diluent in the well was discarded, the plate was washed 5 times with PBST, spin-dried, added with enzyme-labeled antibody (GAM-HRP, V:V=1:5000) by 100 µL/well, incubated and reacted at 25° C. for 1 h.

(5) Color development: the secondary antibody in the well was discarded, the plate was washed 5 times with PBST, spin-dried, added with 100 µL/well of a color development solution, an equal volume mixed A and B, and reacted at 25° C. for 10 min.

(6) Stopping: 2 M sulfuric acid stop solution was added by 50 µL/well to stop the reaction.

(7) Reading plate: dual wavelengths of 450 nm and 630 nm were set as the measuring wavelengths on microplate reader and the OD value of each reaction well was measured.

Figure 3:
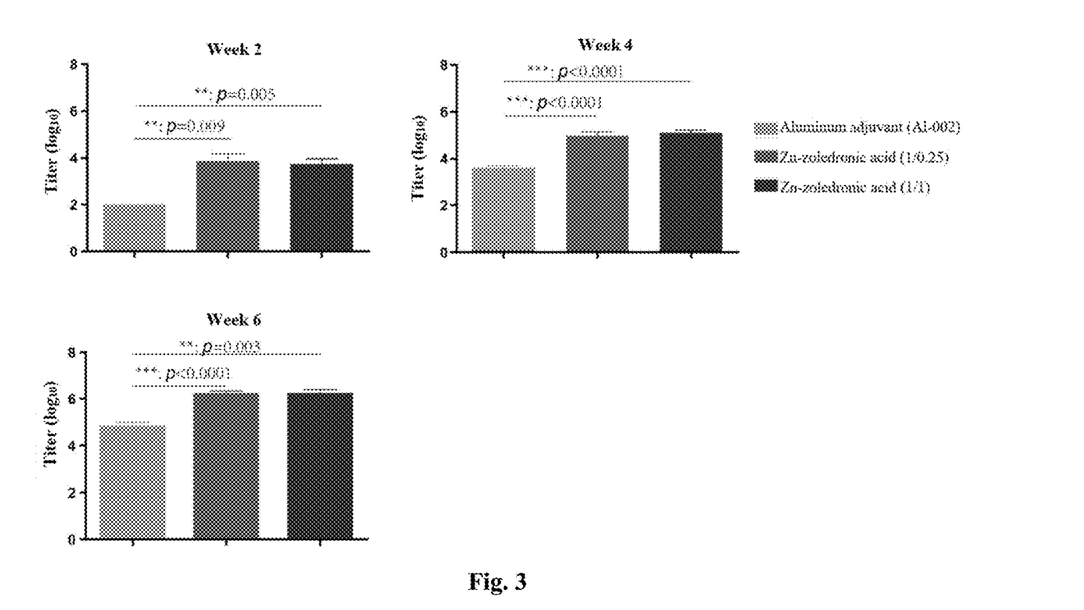
FIG. 3: determination of the adjuvant activity of zinc zoledronate adjuvant in VZV gE vaccine, mean±SD: n=5, *$p<0.05$; $p<0.01$; *$p<0.001$, ****$p<0.0001$.

The experimental results were shown in FIG. 3:

The adjuvant was mixed with the antigen in equal volume to immunize the mice. The immunization, the blood sampling and the determination of serum antibody titer were performed according to the above-mentioned strategy. In the zinc zoledronate adjuvant group, the mice showed a rapid and strong onset after one immunization injection; after two immunization injections, the humoral immune enhancement advantage showed a statistically significant difference as compared with the aluminum adjuvant group, and the difference was still significant after three immunization injections.

Example 6: Effect of Zinc Zoledronate Adjuvant Combined with Recombinant Protein VZV gE on Mouse Antibody Isotypes The immunization strategy referred to Example 5.
Experimental Materials:
1. Antigen coating solution: 1× PB 7.4 buffer solution (4.343 g of $Na_2HPO_4 \cdot 7H_2O$; 0.456 g of $NaH_2PO_4$).
2. Washing solution: PBST, ELISA kit from Beijing Wantai Company.
3. Blocking solution: 2× ED (Enzyme Dilution): 1×PBS+ 0.5% casein+2% gelatin+0.1% preservative (proclin-300), diluted to 1× with ultrapure water or distilled water for sealing and sample dilution.
4. Color development solution A: ELISA kit from Beijing Wantai Company.
5. Color development solution B: ELISA kit from Beijing Wantai Company.
6. Stop solution: Beijing Wantai Company ELISA kit.

Experiment Procedure (1) Coating plate: the VZV gE antigen was diluted with PB7.4 coating buffer solution to a certain concentration, added to a 96-well polystyrene plate by 100 µL/well, and the plate was coated overnight at 4° C.

(2) Blocking: the coating solution in the well was discarded, the plate was washed once with PBST, spin-dried, added with blocking solution by 200 µL/well, and blocking was performed for 4 hours at room temperature.

(3) Adding serum to be tested: Serum used for serum antibody isotype detection: 2 weeks post the completion of 3 immunization injections, that was, the serum of the 6th week; the blocking solution in the well was discarded, the plate was washed once with PBST, spin-dried, added with the serum to be tested at a certain degree of dilution by 100 µL/well, incubated and reacted for 1 h at 25° C.

(4) Adding enzyme-labeled antibody: the serum diluent in the well was discarded, the plate was washed 5 times with PBST, spin-dried, added with enzyme-labeled antibody that specifically recognized each antibody isotype (IgG1, V:V=1:30000; IgG2a, V:V=1:1000; IgG2b, V:V=1:1000) by 100 µL/well, incubated and reacted at 25° C. for 1 h.

(5) Color development: the enzyme-labeled antibody in the well was discarded, the plate was washed 5 times with PBST, spin-dried, added with a color development solution, a equal volume mixed A and B diluted by 3 times, by 100 µL/well, reacted at 25° C. for 10 min.

(6) Stopping: 50 µL/well of 2 M sulfuric acid stop solution was added to stop the reaction.

(7) Reading plate: dual wavelengths of 450 nm and 630 nm were set as the measuring wavelengths on microplate reader, and the OD value of each reaction well was measured.

Figure 4:
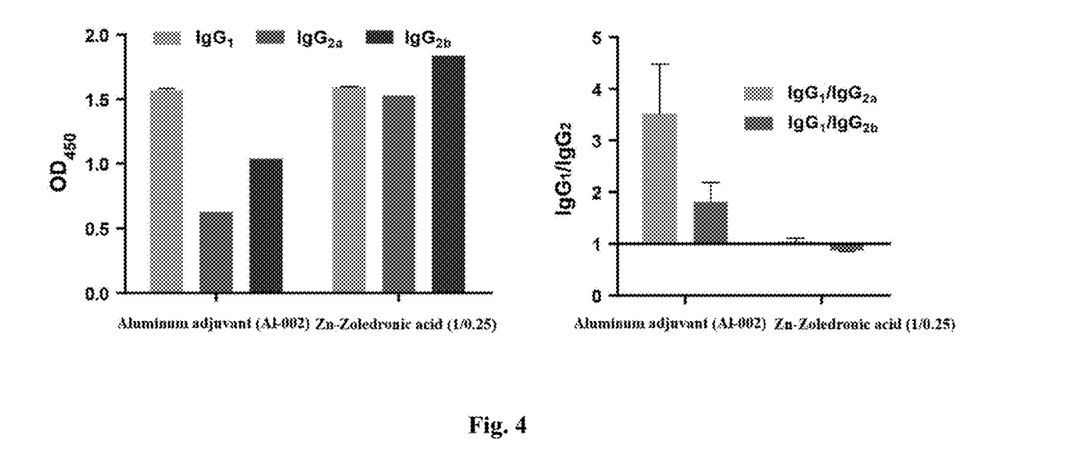
FIG. 4: effect of zinc zoledronate adjuvant combined with recombinant VZV gE protein on mouse antibody isotypes, mean±SD: n=5, *$p<0.05$; $p<0.01$; *$p<0.001$, ****$p<0.0001$.

The experimental results were shown in FIG. 4:

The experimental procedure described in Example 5 was used. The mice were immunized with zinc zoledronate adjuvant or aluminum adjuvant in combination with recombinant VZV gE protein by intramuscular injection. The immunization procedure was the same as that in Example 5. After 3 immunization injections, blood samples were collected after 2 weeks, and the results of levels of each antibody isotype in mouse serum were shown in FIG. 4. Compared with the aluminum adjuvant group, the zinc zoledronate adjuvant group could stimulate higher levels of IgG2a and IgG2b antibody isotypes, and the ratios of IgG1 to IgG2a and IgG2b was lower than that of the aluminum adjuvant group, indicating that it had a certain stimulating effect on the Th1 immune pathway.

Figure 5:
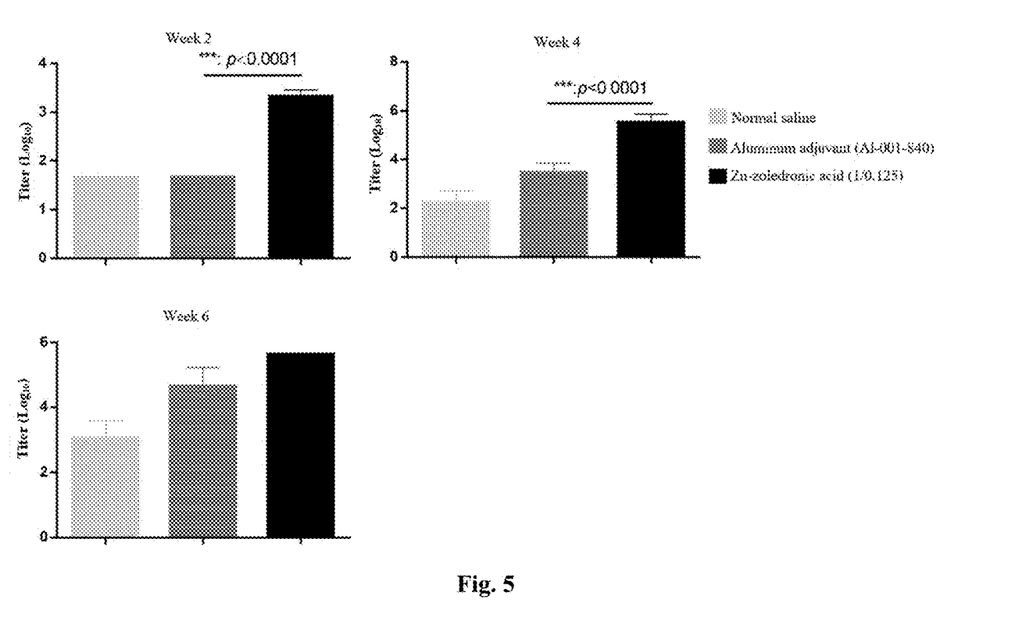
FIG. 5: determination of the adjuvant activity of zinc zoledronate adjuvant for hepatitis B therapeutic protein, mean±SD: n=5, *$p<0.05$; $p<0.01$; *$p<0.001$, ****$p<0.0001$.

Example 7: Determination of Adjuvant Activity of Zinc Zoledronate Adjuvant in Hepatitis B Therapeutic Protein The experimental procedure as described in Example 5 was used. The mice were immunized with zinc zoledronate adjuvant in combination with hepatitis B therapeutic protein by intramuscular injection, and serum antibody titers were determined. The results were shown in FIG. 5: compared with the aluminum adjuvant group, the zinc zoledronate adjuvant group showed rapid onset and strong immune response after one injection of immunization in mice, and the difference was statistically significant; after 2 immunization injections, the humoral immunity enhancement advantage was still significant as compared with the aluminum adjuvant group, and was slightly better than the aluminum adjuvant group after 3 immunization injections.

Figure 6:
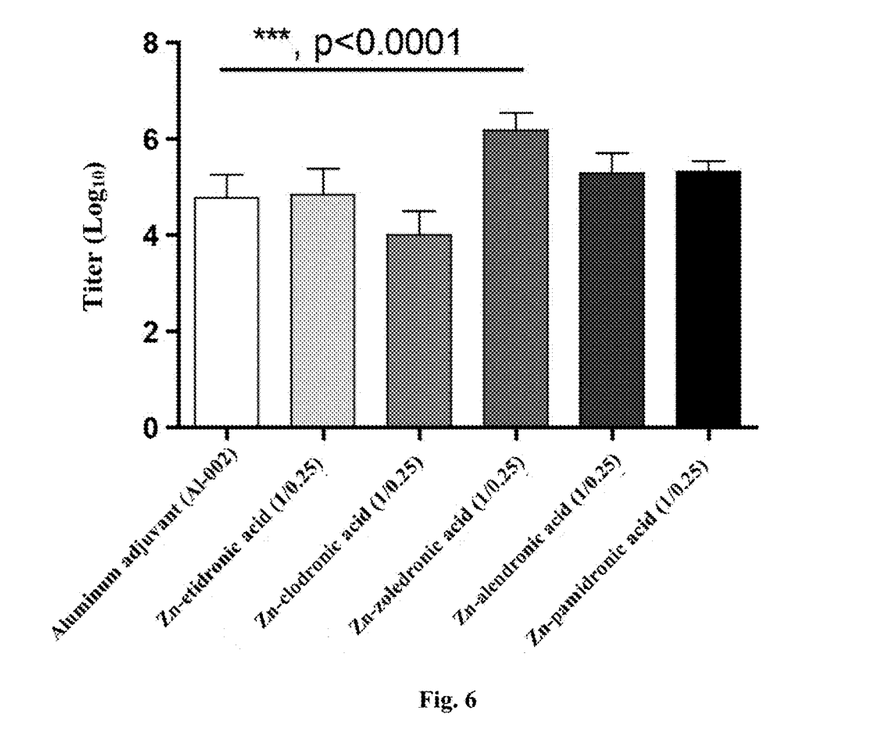
FIG. 6: effect of other zinc bisphosphonate adjuvants (Zn/Zol=1/0.25) combined with VZV gE on mouse serum antibody titer, mean±SD: n=5, *$p<0.05$; $p<0.01$; *$p<0.001$, ****$p<0.0001$.

Example 8: Effect of Other Zinc Bisphosphonate Adjuvants Combined with VZV gE on Mouse Serum Antibody Titers The experimental procedure as described in Example 5 was used. The mice were immunized with a zinc bisphosphonate adjuvant in combination with recombinant VZV gE protein by intramuscular injection, and serum antibody titers were determined. The results were shown in FIG. 6: after 3 immunization injections in mice, the zinc zoledronate adjuvant group showed a significant difference in advancement of humoral immunity enhancement as compared with the aluminum adjuvant group, while the effects of other zinc bisphosphonate adjuvants were not significantly different from that of aluminum adjuvant.

Figure 7:
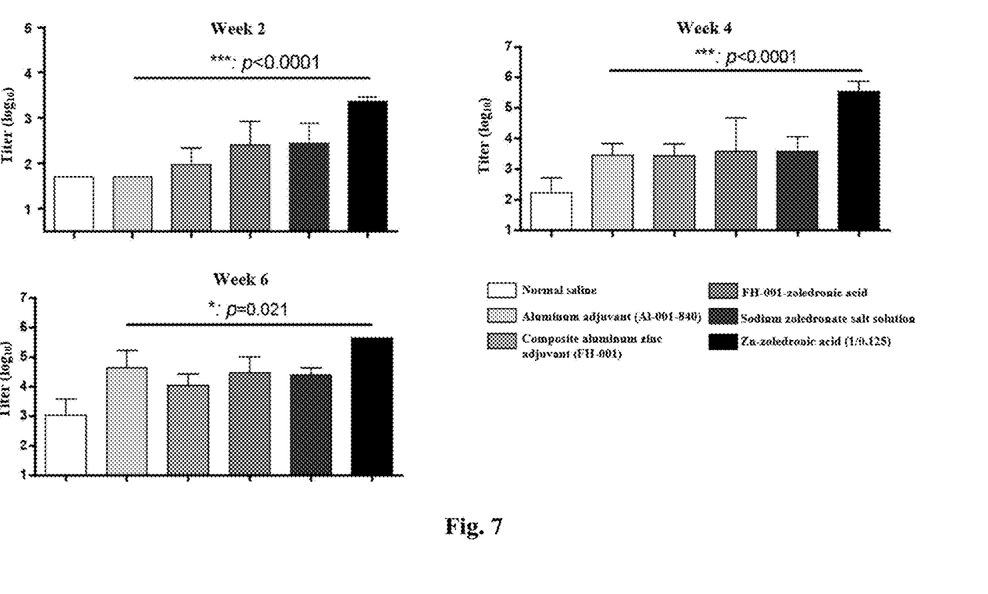
FIG. 7: effect of zoledronic acid and zinc zoledronate modified adjuvants combined with hepatitis B therapeutic protein on mouse serum antibody titer, mean±SD: n=5, *$p<0.05$; $p<0.01$; *$p<0.001$, ****$p<0.0001$.

Example 9: Effect of Zinc Zoledronate Adjuvant Combined with VZV gE on Mouse Serum Antibody Titers The experimental procedure as described in Example 5 was used. The mice were immunized with zinc zoledronate adjuvant in combination with VZV gE by intramuscular injection, and serum antibody titers were determined. As shown in FIG. 7, the aluminum adjuvant, composite zinc-aluminum adjuvant, composite zinc-aluminum adjuvant doped with zoledronic acid, and zinc zoledronate adjuvant showed a gradually increased trend in the level of antibody enhancement, and there was a significant difference by comparing the zinc zoledronate adjuvant group with the aluminum adjuvant group.

What is claimed is:

1. A vaccination method for treatment or prevention of infection in a mammal, said method comprising administering a vaccine composition intramuscularly to a mammal, wherein said vaccine composition comprises an antigen and an adjuvant, wherein the adjuvant comprises zinc zoledronate micro/nanoparticles, and wherein the zinc zoledronate micro/nanoparticles comprise zinc and zoledronic acid at a molar concentration ratio of zinc:zoledronic acid of 1-8:1.

2. The vaccination method according to claim 1, wherein said zinc zoledronate micro/nanoparticles have a molar concentration ratio of zinc:zoledronic acid selected from 1:1, 4:1 and 8:1.

3. The vaccination method according to claim 1, characterized in any one of the following:
   (1) said zinc zoledronate micro/nanoparticles further comprise a phosphate at a molar concentration ratio of zinc:phosphate of 1-8:1; and
   (2) said zinc zoledronate micro/nanoparticles further comprise a phosphate at a molar concentration ratio of zinc:phosphate selected from 1.5:1 and 4:1.

4. The vaccination method according to claim 1, characterized in any one of the following:
   (1) said zinc zoledronate micro/nanoparticles further comprise aluminum at a molar concentration ratio of zinc:aluminum of 0.02-1:1; and
   (2) said zinc zoledronate micro/nanoparticles further comprise aluminum at a molar concentration ratio of zinc:aluminum selected from 0.375:1, 0.5:1 and 0.8:1.

5. The vaccination method according to claim 1, wherein the zinc zoledronate micro/nanoparticles are prepared by a method comprising the following steps:
   a) providing a soluble salt solution containing zinc ions;
   b) evenly mixing the soluble salt solution of step a) with a zoledronic acid and a sodium hydroxide; or
   evenly mixing the soluble salt solution of step a) with a zoledronic acid, a sodium hydroxide, and a sodium phosphate solution,
   in a manner of sequential precipitation, separated precipitation followed by mixing, or co-precipitation, to obtain the adjuvant comprising zinc zoledronate micro/nanoparticles.

6. The vaccination method according to claim 5, characterized in one or more of the following:
   (1) said salt solution comprises a solution of hydrochloric acid; and
   (2) said method further comprises subjecting the mixture of step b) to sterilization, and storing at 2° C. to 8° C. for later use.

7. The vaccination method according to claim 6, characterized in any one of the following:
   (1) said sterilization comprises a sterilization using a high temperature and high pressure sterilization technique; and
   (2) said sterilization comprises a sterilization performed at 121° C. for 30 to 60 minutes.

8. The vaccination method according to claim 1, characterized in one or more of the following:
   (1) said adjuvant has a pH of 8.0-9.0 before sterilization;
   (2) said adjuvant has a pH of 6.0-8.0 after sterilization;
   (3) said zinc zoledronate micro/nanoparticles have a particle size of 1-10 μm;
   (4) said adjuvant has a particle zero charge point of 4.0-11.4; and
   (5) said adjuvant has a protein adsorption rate of >80%.

9. The vaccination method according to claim 8, wherein said protein comprises bovine serum albumin.

* * * * *